Patented July 2, 1946

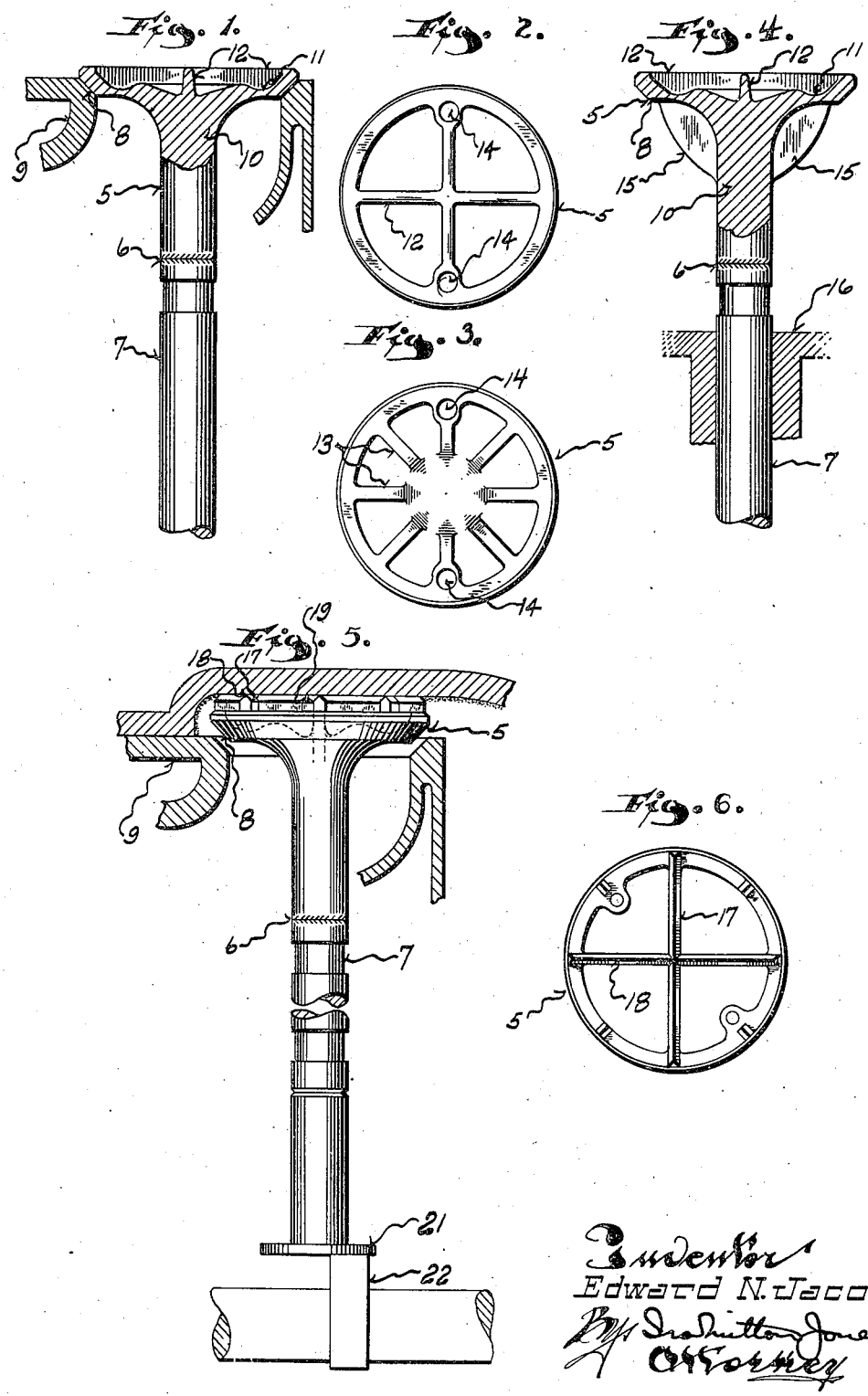

2,403,001

UNITED STATES PATENT OFFICE 2,403,001

VALVE FOR INTERNAL COMBUSTION ENGINES

Edward N. Jacobi, Milwaukee, Wis., assignor to Briggs & Stratton Corporation, Milwaukee, Wis., a corporation of Delaware Application November 13, 1944, Serial No. 563,169

8 Claims. (Cl. 123—188)

This invention relates to valves for internal combustion engines and, like the copending application of Hugh S. Brown, Serial No. 566,327, filed December 2, 1944, refers particularly to valves the heads of which are formed of a heat resisting alloy such as Stellite.

Bearing in mind the high cost of such heat resisting alloys, it is an object of this invention to provide a valve for internal combustion engines so designed as to minimize the mass of the valve head and thus reduce the amount of the expensive alloy required.

Inasmuch as valve heads made of Stellite or other similar heat resisting alloys are cast, it is possible to so design the head as to achieve objects and purposes impossible in constructions where the valve is made by the ordinary wrought method. For instance, the valve head may be so designed and constructed as to achieve certain thermal characteristics such as the conduction of heat either to the seat with which the valve cooperates, or its stem guide with a view toward more rapidly carrying the heat developed in the head off to cooler parts of the engine; and it is an object of this invention to provide a valve having a head so constructed that these objectives are attained.

Another object of this invention is to provide a valve having a head cast of a heat resisting alloy, which incorporates on the upper surface thereof sharp edged reinforcing ribs of a height to just clear the ceiling of the valve chamber in which the valve operates so as to chisel or cut away any carbon deposits which tend to form on the ceiling of the valve chamber.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates several complete examples of the physical embodiment of the invention constructed in accordance with the best modes so far devised for the practical application of the principles thereof, and in which:

Figure 1 is a view in side elevation of a valve embodying this invention with a part of its head broken away and in section;

Figure 2 is a top plan view thereof;

Figure 3 is a view similar to Figure 2 but illustrating a modified arrangement of ribs;

Figure 4 is a view similar to Figure 1 showing the manner in which reinforcing and heat conducting ribs are used to carry the heat down into the stem;

Figure 5 is a view of a valve shown in side elevation and illustrating the use of sharp edged ribs or projections on the top thereof to cut away carbon deposits; and Figure 6 is a top plan view of the valve shown in Figure 5.

Referring now particularly to the accompanying drawing, in which like numerals indicate like parts, the numeral 5 designates the head of a valve which, in accordance with this invention, is cast of a heat resisting alloy such as Stellite which remains hard at red heat. This head is welded, brazed or otherwise secured as at 6 to a stem 7 of austenitic steel or any other material having adequate toughness and hardness, as fully described in the aforesaid copending application.

Being cast, the head 5 may be designed to meet any desired thermal characteristics and in the embodiment of the invention shown in Figures 1, 2 and 3 the design is such as to carry the heat from the head out to its seat engaging rim 8 and thence to the seat 9.

This arrangement enables rapid heat dissipation and at the same time accomplishes a desirable purpose in that it minimizes the mass of the head and thus lightens the valve.

To this end the rim portion 8 of the valve is joined to its central stem portion 10 by a thin walled section 11. This thin walled section 11 practically isolates the rim portion 8 from the balance of the head. Structural strength is achieved through the use of radial ribs 12 which extend up from the top of the thin walled section 11 and connect the rim portion 8 with the stem portion 10.

In addition to providing structural strength, these ribs also accelerate the flow of heat out to the rim portion 8 and thence to the seat 9. This latter function is even better accomplished by the arrangement of ribs 13 shown in Figure 3 where they extend radially in from the rim portion 8 but terminate short of the central stem portion 10.

In both instances, pockets or notches 14 open to the top of the valve for the reception of the prongs of a valve grinding tool.

In the embodiment of the invention illustrated in Figure 4 the thin walled section 11 is reinforced by radial ribs 15 at the under side of the head. These ribs, besides providing structural strength for the head, materially increase the cooling surface exposed to the incoming gases and, where occasion requires, might be designed to guide the gas stream to those parts of the port in which the velocity is ordinarily low. This arrangement of the ribs also carries the heat from the valve head down into its stem portion and thence to the guide 16 in which the stem reciprocates.

In that form of the invention illustrated in Figures 5 and 6, the head has ribs 17 projecting from the top thereof as in the construction shown in Figures 1, 2 and 3, but in this instance the ribs protrude above the surface of the valve proper and terminate in sharpened chisel-like edges 18. The height of these ribs is such that they just clear the ceiling 19 of the valve chamber in which the valve operates, so that any carbon tending to accumulate on the ceiling of the valve chamber above the valve is constantly cut away.

To insure this result, the mechanism for lifting the valve incorporates suitable means for rotating the valve. One such scheme is illustrated in Figure 5 where a disc or flange 21 is secured to the lower end of the valve stem to be engaged at its outer portion by the valve lifting cam 22. Obviously, each time the cam lifts the valve it will impart rotation to the stem so that the chisel edged ribs are continuously presented to different areas of the ceiling 19.

From the foregoing description, taken in connection with the accompanying drawing, it will be readily apparent to those skilled in the art that this invention provides a valve for internal combustion engines having advantages not previously attainable.

What I claim as my invention is:

1. A valve installation for internal combustion engines comprising: a valve chamber having a floor and a ceiling, with a valve seat in the floor; a valve having a head disposed in said chamber and movable vertically therein, said head having a rim portion adapted to engage said seat; and sharp edged upward projections on the top of the valve head of a height to just clear the ceiling of the valve chamber as the valve is lifted so as to constantly cut away any carbon deposits which tend to form on the ceiling above the valve.

2. A valve installation for internal combustion engines comprising: a valve chamber having a floor and a ceiling, with a valve seat in the floor; a valve having a head disposed in said chamber and movable vertically therein, said head having a rim portion adapted to engage said seat; sharp edged upward projections on the top of the valve head of a height to just clear the ceiling of the valve chamber as the valve is lifted so as to constantly cut away any carbon deposits which tend to form on the ceiling above the valve; and means for rotating the valve as it is lifted to constantly change the points at which the sharp edged projections contact any carbon deposits above the valve.

3. In a valve for internal combustion engines: a head cast of a heat resisting alloy (such as Stellite) and having a seat engaging rim portion joined to a stem portion by a wall section having less thickness than the width of the seat; and radial ribs connected to the back of the rim remote from the seat engaging area of the head with said radial ribs bridging the thin wall section between the rim and the stem portion of the valve.

4. In a valve for internal combustion engines: a stem portion; a head on the stem cast of a heat resisting alloy (such as Stellite), said head having a seat engaging rim portion at its outer periphery and an annular thin walled section joining the rim portion to the inner central portions of the head with said thin walled section constituting the area of least thickness of the head; and radial ribs joined to the back of the rim portion of the head and extending inwardly and passing over the thin walled section to bridge the same and to reinforce the head at its point of minimum thickness.

5. In a valve for internal combustion engines: a head cast of a heat resisting alloy (such as Stellite) and having a seat engaging rim portion joined to a stem portion by an annular thin wall section, the wall backing the seat engaging portion of the head constituting the rim portion of the valve being thinner than the width of the seat; ribs connected to the back of the rim portion on the combustion chamber side of the valve head and bridging across the thin wall section adjoining the stem; and radial ribs on the underside of the head joining said rim portion of the head with the stem portion to mechanically reinforce the thin wall section and to carry heat between the stem and rim.

6. In a valve for internal combustion engines: a head cast of a heat resisting alloy (such as Stellite) and having a seat engaging rim portion joined to a stem portion by an annular thin wall section, the wall backing the seat engaging portion of the head and constituting the rim portion of the valve being thinner than the width of the seat and the thin wall section circumscribed by the rim portion having a thinner section than the rim portion; ribs connected to the back of the rim portion on the combustion chamber side of the valve head and bridging across the thin wall section adjoining the stem; and radial ribs on the underside of the head joining said rim portion of the head with the stem portion to mechanically reinforce the thin wall section and to carry heat between the stem and rim.

7. In a valve for internal combustion engines: a head cast of a heat resisting alloy (such as Stellite) and having a seat engaging rim of substantially uniform wall thickness in a direction at right angles to the seat engaging surface of the rim; a thin wall connecting the central portion of the head to the rim at the smallest diameter of the rim; and combination heat conducting and reinforcing ribs integral with said thin walled section and extending inwardly from the rim across the thin wall section toward the central portions of the head.

8. In a valve for internal combustion engines of the type having a valve located in a combustion pocket with a valve seat in one wall of the pocket and the valve opening by motion of its head toward a wall of the pocket opposite the seat, characterized by a head for the valve equipped with sharp edged ribs projecting from its top surface in a direction toward the wall of the pocket in which the valve is to operate opposite the seat for continuously cutting away any carbon deposit which tends to form on said opposite wall of the pocket.

EDWARD N. JACOBI.